(12) United States Patent
Sisken et al.

(10) Patent No.: US 8,156,733 B2
(45) Date of Patent: Apr. 17, 2012

(54) METHOD OF OPERATING AN INTERNAL COMBUSTION ENGINE TO HEAT UP A SELECTIVE CATALYST REDUCER

(75) Inventors: Kevin Dean Sisken, Saline, MI (US); Matthew Thomas Baird, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 1048 days.

(21) Appl. No.: 12/040,038

(22) Filed: Feb. 29, 2008

(65) Prior Publication Data

US 2009/0217645 A1 Sep. 3, 2009

(51) Int. Cl.
*F01N 3/00* (2006.01)
*F01N 3/10* (2006.01)

(52) U.S. Cl. ............ 60/286; 60/274; 60/284; 60/295; 60/300; 60/301

(58) Field of Classification Search ............ 60/274, 60/284, 285, 286, 295, 297, 300, 301, 311
See application file for complete search history.

(56) References Cited

U.S. PATENT DOCUMENTS

| | | | |
|---|---|---|---|
| 5,052,178 A * | 10/1991 | Clerc et al. ............ 60/274 |
| 5,976,475 A | 11/1999 | Peter-Hoblyn et al. |
| 6,063,350 A | 5/2000 | Tarabulski et al. |
| 7,210,288 B2 | 5/2007 | Bandl-Konrad et al. |
| 2004/0173090 A1* | 9/2004 | Kondou et al. ............ 95/1 |
| 2004/0206069 A1* | 10/2004 | Tumati et al. ............ 60/285 |
| 2007/0000239 A1 | 1/2007 | Liu et al. |
| 2007/0261388 A1* | 11/2007 | Kroepke et al. ............ 60/273 |

* cited by examiner

*Primary Examiner* — Thomas Denion
*Assistant Examiner* — Audrey K Bradley
(74) *Attorney, Agent, or Firm* — Bill C. Panagos; Rader, Fishman & Grauer PLLC

(57) ABSTRACT

In one embodiment, the present invention relates to a method to operate an internal combustion engine equipped with an Electronic Control Unit (ECU) with memory, an exhaust system including a Diesel Oxidation Catalyst (DOC), a Diesel Particulate Filter (DPF), upstream of a Selective Catalyst Reducer (SCR). A doser is in the DPF and actuated by commands from the ECU. The method includes sensors at the DPF and SCR electronically connected to the ECU to transmit data signals indicative of operating conditions at the DPF and SCR. The method includes sensing the temperature at an outlet of the DPF and an inlet at the SCR, determining whether that temperature is at least a predetermined temperature for a predetermined period of time, and introducing heat to the SCR to raise its temperature to a predetermined level for a predetermined period of time, such as light off temperature, to operate more efficiently. Heat may be introduced in the exhaust stream by engine thermal management strategies as well.

6 Claims, 2 Drawing Sheets

METHOD OF OPERATING AN INTERNAL COMBUSTION ENGINE TO HEAT UP A SELECTIVE CATALYST REDUCER

TECHNICAL FIELD

In order for a Selective Catalyst Reducer (SCR) to operate effectively, there is a minimum temperature requirement which is needed for urea evaporation and hydrolysis in addition to a minimum temperature for the SCR itself to effectively reduce NOx from the exhaust stream. In systems that include a Diesel Oxidation Catalyst (DOC) and Diesel Particulate Filter (DPF) upstream of the SCR, the DOC and DPF must also operate at least at some predetermined temperature for a pre-determined period of time. During cold engine starts, or during engine warm-up periods, exhaust gas heat must reach the SCR to permit it to reach a temperature sufficient to operate efficiently to reduce NOx from the exhaust stream.

There is a need for a method to operate an internal combustion engine equipped with an SCR to permit the SCR to reach a predetermined temperature for a predetermined period of time in order to efficiently remove NOx from an exhaust stream.

In addition, there is a need to operate an internal combustion engine equipped with a DPF and an SCR to reduce cool down rates of the SCR during low engine speed operating conditions to permit the SCR to efficiently remove NOx from the exhaust gas stream.

These and other advantages may be understood by reading the attached specification and appended claims.

SUMMARY OF THE INVENTION

In one embodiment, the present invention relates to a method to operate an internal combustion engine equipped with an Electronic Control Unit (ECU) with memory, an exhaust system including a Diesel Particulate Filter (DPF), a doser system in contact with said DPF actuated by commands from said ECU, a Diesel Oxidation Catalyst (DOC) upstream of a Selective Catalyst Reducer (SCR), and sensors at said DPF and said SCR electronically connected to said ECU to transmit data signals indicative of operating conditions at said Diesel Particulate Filer and said Selective Catalyst Reducer. The method is directed to heating the Selective Catalyst Reducer to a temperature sufficient to operate efficiently. The method may comprise the steps of, sensing the temperature of the SCR at its inlet;

determining whether the temperature at the SCR inlet is at least a predetermined minimum temperature for a predetermined period of time to permit efficient operation of the SCR to reduce exhaust NOx;

sensing temperature of the DPF at its outlet;

determining whether the temperature at the DPF outlet is at least a predetermined minimum temperature for a predetermined period of time to permit light off of the DPF; and introducing heat into the exhaust stream sufficient to raise the SCR and the DPF to a predetermined minimum temperature for a predetermined period of time.

Heat may be introduced to the exhaust stream by resort to engine thermal management strategies to increase temperature of said engine exhaust stream. The engine thermal management strategies may include, but are not limited to, changing engine airflow EGR flow rate, fuel injection timing, fuel injection quantity; engine speed and engine torque. In addition, a predetermined quantity of fuel may be passed through the doser system upstream of the DOC and ignited to introduce heat to the exhaust stream until the predetermined temperature for the predetermined period of time is reached. Preferably, the predetermined temperature is light off temperatures of either, or both of the DPF and SCR. The doser may be used regardless of whether engine management strategies are employed to increase engine exhaust temperatures. In addition, the doser may be used even after the DPF light off temperature is reached to increase operating efficiency of the SCR.

DETAILED DESCRIPTION OF THE PREFERRED EMBODIMENT(S)

Figure 1:
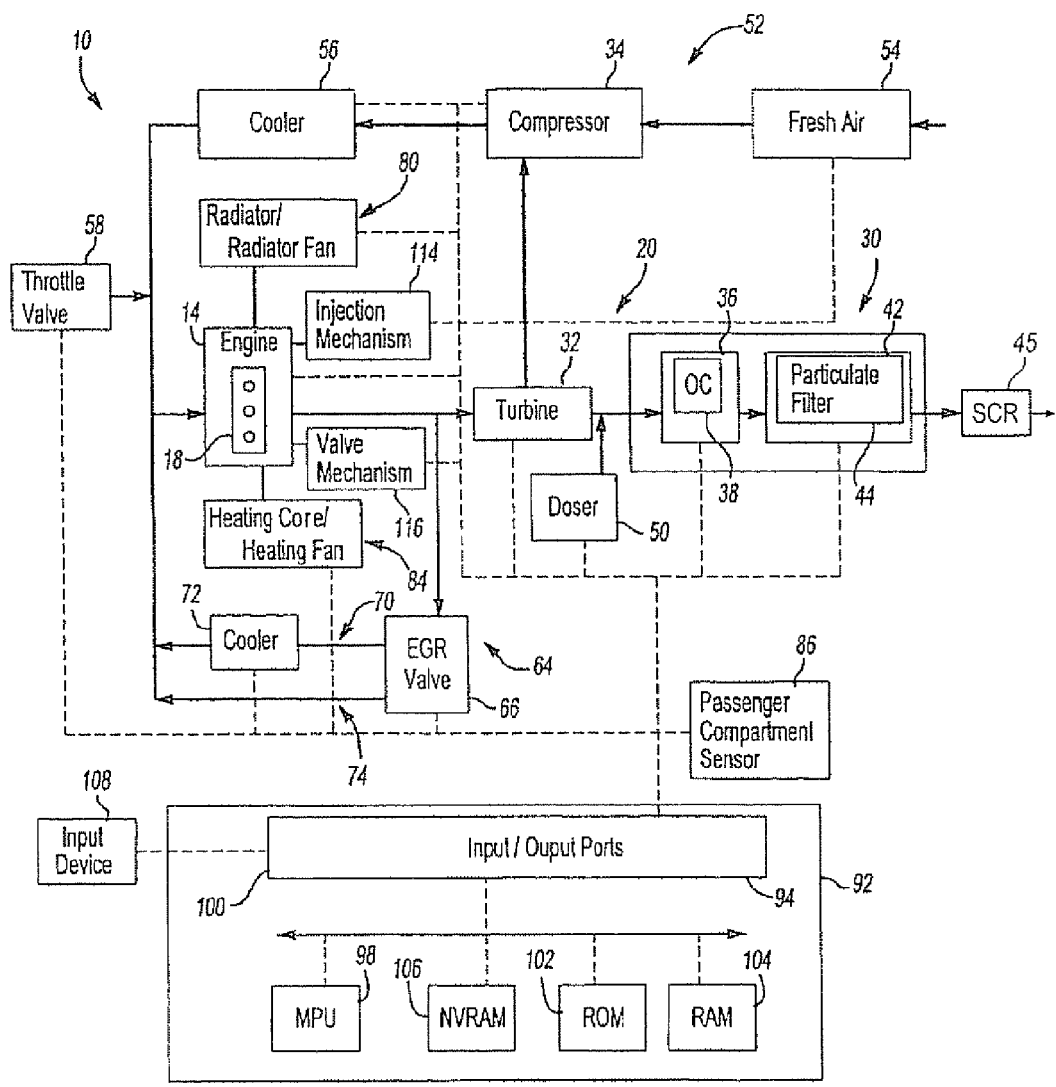
FIG. 1 is a schematic representation of an internal combustion engine useful in the present invention showing the doser, DOC, DPF and the SCR.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats recreational vehicle, light and heavy-duty work vehicles, and the like.

The system 10 may be referred to as an internal combustion driven system wherein fuels, such as gasoline and diesel fuels, are burned in a combustion process to provide power, such as with a spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally the system 20 may include a turbocharger proximate the exhaust manifold for compressing flesh air delivery into the engine 14. The turbocharger, for example, may include a turbine 32 and a compressor 34, such as a variable geometry turbocharger (VGT) and/or a turbo compound power turbine. Of course, the present invention is not limited to exhaust systems having turbochargers or the like.

The particulate filter assembly 30 may be configured to capture particulates associated with the combustion process. In more detail, the particulate filter assembly 3O may include an oxidation catalyst (OC) canister 36, which in includes an oxidation catalyst (OC) 38 and a particulate filter canister 42, which includes a particulate filter 44. The canisters 36, 42 may be separate components joined together with a clamp or other feature such that the canisters 36, 42 may be separated for servicing and other operations. Of course the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions there between to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases. The doser may be situated on or in close proximity to the DPF to facilitate light off of the DPF. A Selective Catalyst Reducer (SCR) 45 to reduce NOx in the exhaust stream is located downstream of the DOC and the DPF.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. Optionally, the throttle intake valve 58 may also be provided to control the flow of EGR gases to the engine 14 or control both fresh air and EGR gases to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64 for example, may dilute the incoming air charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an ER cooler passage 70, which includes an EOR cooler 72, and an EGR cooler bypass 74. The EGR valve 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems including more or less of these features, such as an EGR system having only one of the EGR cooler passage or bypass.

A cooling system 80 may be included for cycling the engine 14 by cycling coolant there through. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciate. It is contemplated, however, that the present invention may include more or less of these features in the cooling system 80 and the present invention is not intended to be limited to the exemplary cooling system described above.

The cooling system 80 may operate in conjunction with a heating system 84. The heating system 84 may include a heating core, a heating fan, and a heater valve. The heating core may receive heated coolant fluid from the engine 14 through the heater valve so that the heating fan, which may be electrically controllable by occupants in a passenger area or cab of a vehicle, may blow air warmed by the heating core to the passengers. For example, the heating fan may be controllable at various speeds to control an amount of warmed air blown past the heating core whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof In one non-limiting aspect of the present invention, the controller 92 may be the DDEC controller available from Detroit Diesel Corporation, Detroit. Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or sub-systems, including an exhaust system controller to control exhaust gas temperatures, mass flow rates, and other features associated therewith. In addition, these controllers may include other controllers besides the DDEC controller described above.

Figure 2:
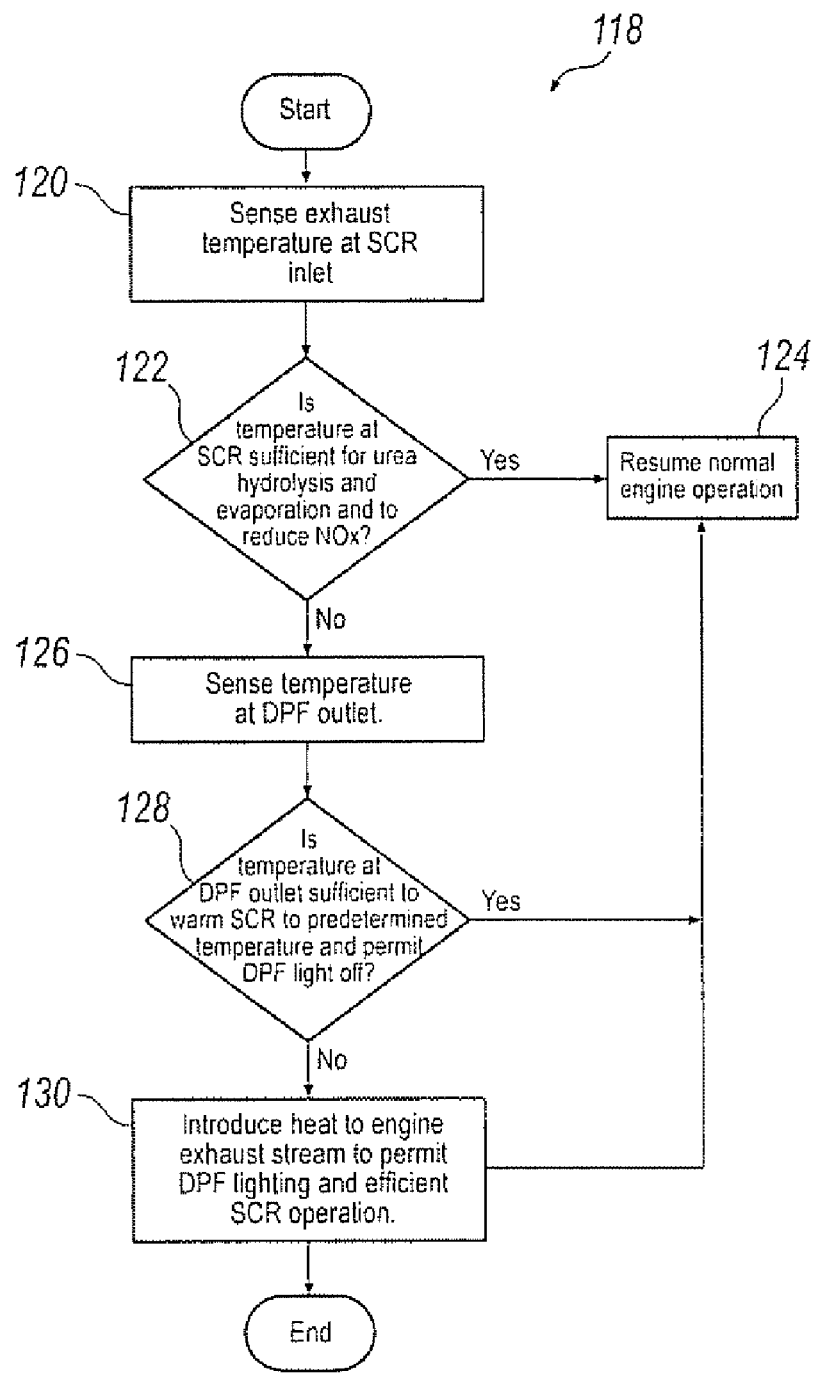
FIG. 2 is a software flowchart representing one method of operation according to the present invention.

FIG. 2 is a software flow chart showing one embodiment of the method 118 of the present invention. Specifically, step 120 is sensing the temperature of the exhaust stream at the inlet of the SCR. The exhaust temperature is extremely important in heating the SCR to an efficient operating temperature. During cold start or during low engine speeds, insufficient heating of the SCR may result in decreased ability to remove NOx from the exhaust stream. Step 122 is determining whether the temperature at the SCR inlet is at least a predetermined temperature for a predetermined period of time. The required temperatures may be held in tables or otherwise in memory in the ECU or other electronic controller. If the temperature is sufficient to efficiently operate the SCR, no further action is needed and the engine continues normal engine operation as seen at step 124. If the temperature is not sufficient to facilitate urea evaporation and hydrolysis in addition to effectively reducing exhaust NOx for a predetermined period of time, step 126 is sensing the temperature of the DPF at its outlet, which is upstream of the SCR. Step 128 is determining whether the temperature of the DPF is sufficient to efficiently operate the DPF and to heat the SCR. If yes, the engine continues normal operation as at step 126. If not, step 130 is introducing heat to the exhaust stream sufficient to permit the DPF to reach light of temperature and the SCR to reach the temperature sufficient for urea evaporation and hydrolysis in addition to temperature sufficient to permit the SCR to reduce the NOx in the exhaust stream. In one aspect, the exhaust temperature may be changed by implementing various engine thermal management strategies. These may include, but are not limited to changing engine airflow, EGR flow rate, fuel injection timing, fuel injection quantity, engine speed and engine torque. In another aspect, the exhaust temperature may be increased by introducing fuel through the doser and igniting the fuel to increase the temperature in the exhaust stream. In addition, the exhaust gas stream temperature may be increased even if the SCR and DPF are operating at the predetermined minimum temperatures for a predetermined period of time required by utilizing the doser even if the minimum temperatures have been reached in order to increase the efficiency of the SCR.

Those skilled in the art understand that the words used in this specification are words of description, and not words of limitation. Many variations and modifications will become apparent upon a reading of the specification without departing form the scope of the appended claims.

We claim:

1. A method to operate an internal combustion engine equipped with an Electronic Control Unit (ECU) with memory, an exhaust system including, a Diesel Particulate Filter (DPF), a doser in said DPF actuated by commands from said ECU, a Diesel Oxidation Catalyst (DOC) upstream of a Selective Catalyst Reducer (SCR), and sensors at said DPF and said SCR electronically connected to said ECU to transmit data signals indicative of operating conditions at said DPF and said SCR, said method to heat said SCR to a temperature sufficient to operate efficiently, comprising;

sensing temperature of said SCR at an inlet thereof;
determining whether said temperature at said SCR inlet is at least a predetermined minimum temperature for a predetermined period of time to permit efficient operation of said SCR to reduce exhaust NOx;
sensing temperature of said DPF at an outlet thereof;
determining whether said temperature at said DPF outlet is at least a predetermined minimum temperature for a predetermined period of time to permit light off of said DPF;

introducing heat into the exhaust stream sufficient to raise said SCR and said DPF to each of said predetermined minimum temperatures for each of said predetermined periods of time; and introducing fuel to said doser in said DPF after said DPF light off temperature is reached to increase operating efficiency of said SCR.

2. The method of claim 1, wherein a predetermined quantity of fuel is passed through said doser in said DPF and igniting said fuel to introduce heat to said exhaust stream until said predetermined temperature at said DPF outlet for said predetermined period of time is reached.

3. The method of claim 1, wherein said predetermined temperature of said DPF is light off temperature.

4. The method of claim 1, wherein said predetermined temperature for said SCR is sufficient for urea evaporation and hydrolysis.

5. The method of claim 1, wherein introducing heat to the exhaust stream is accomplished by resorting to engine thermal management strategies to increase temperature of said engine exhaust stream.

6. The method of claim 5, wherein said engine thermal management strategies include changing engine airflow, EGR flow rate, fuel injection timing, fuel injection quantity, engine speed and engine torque.

\* \* \* \* \*